April 5, 1927.  
T. H. STRACHAN  
1,623,137  
SHIPPING ATTACHMENT FOR WEIGHING SCALES  
Filed Aug. 1, 1925    3 Sheets-Sheet 1
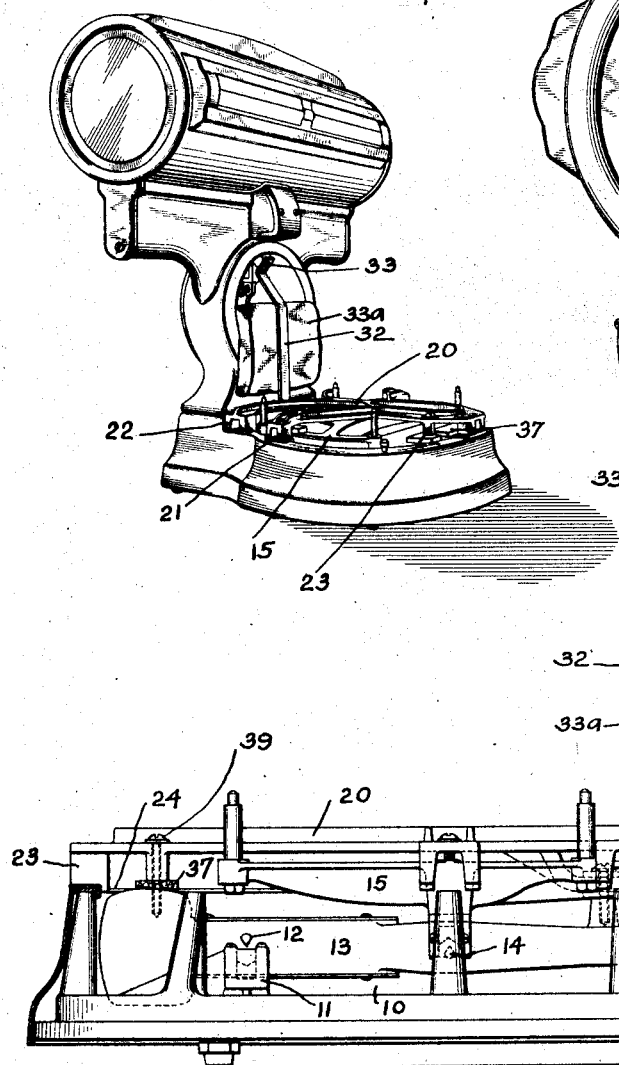
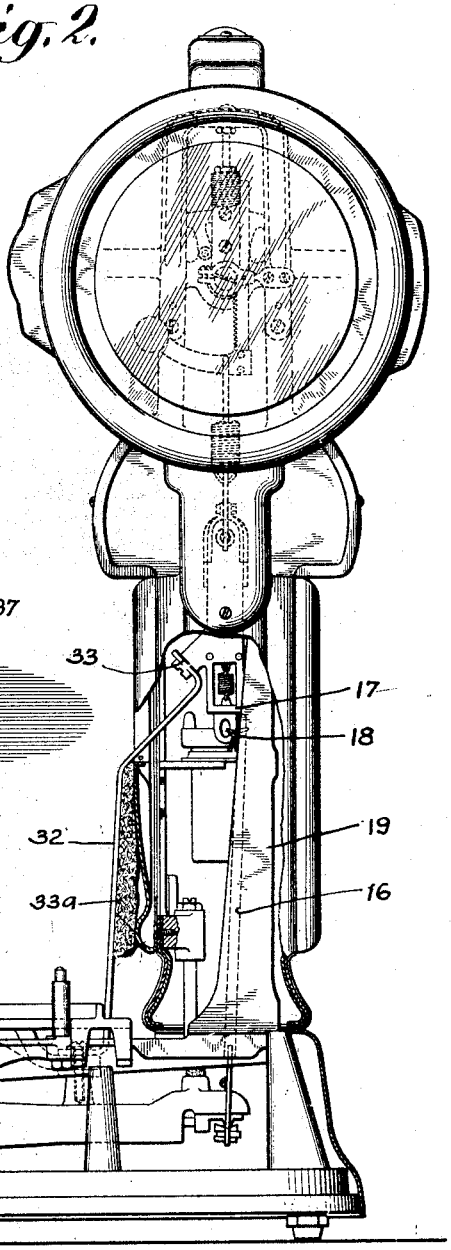
Inventor  
T. H. Strachan  
By his Attorneys  
Cooper, Kerr & Dunham

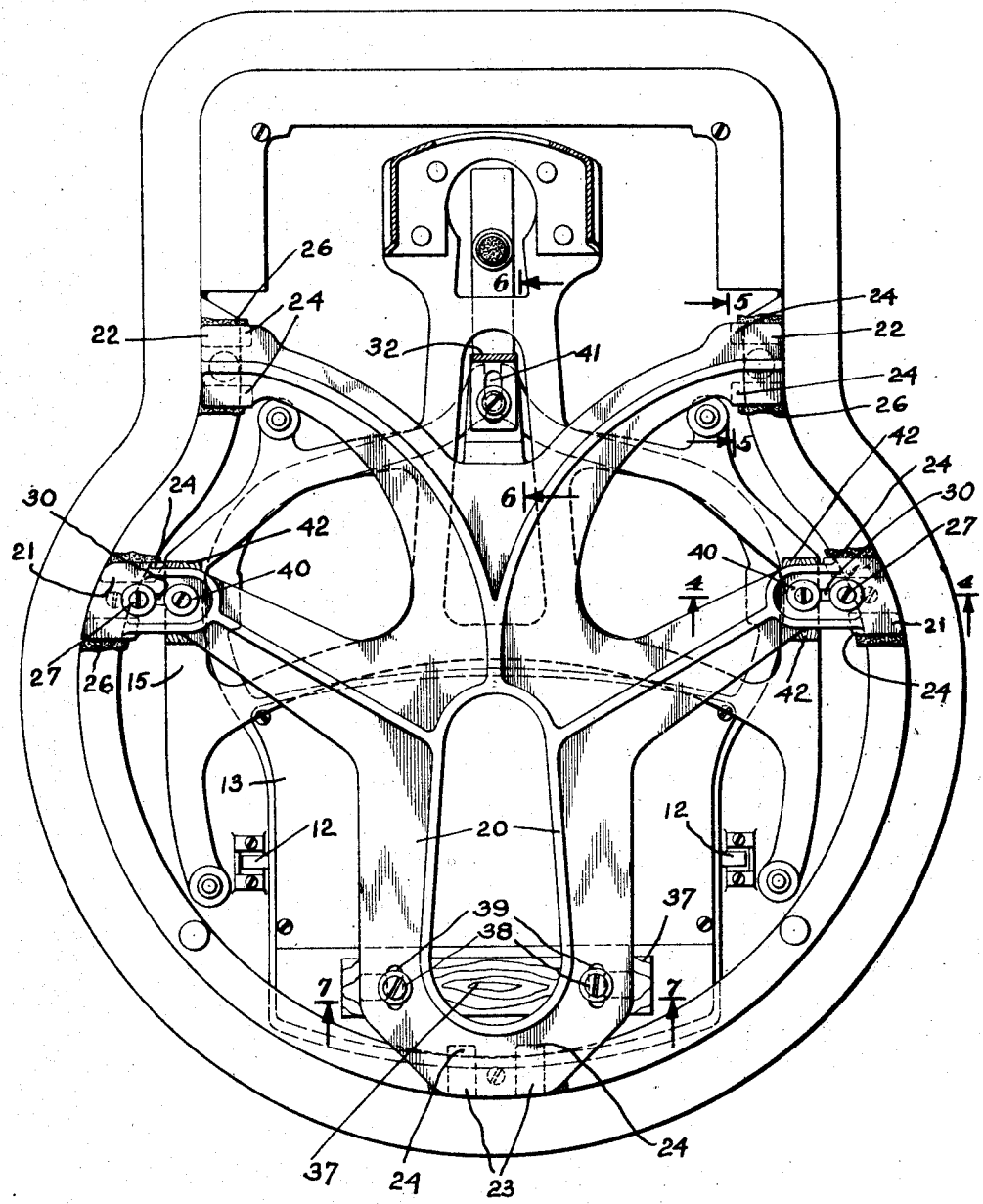

April 5, 1927. 1,623,137
T. H. STRACHAN
SHIPPING ATTACHMENT FOR WEIGHING SCALES
Filed Aug. 1, 1925 3 Sheets-Sheet 3
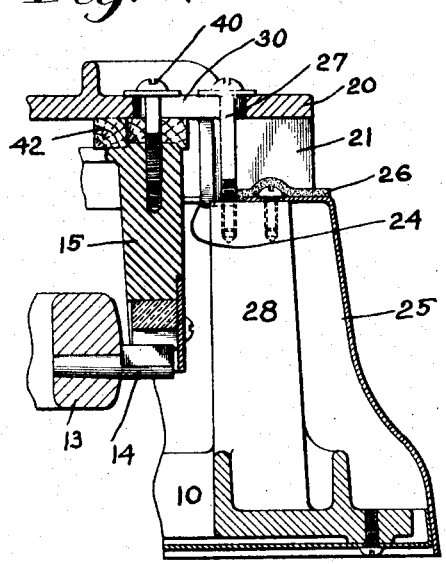
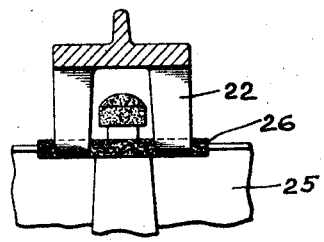
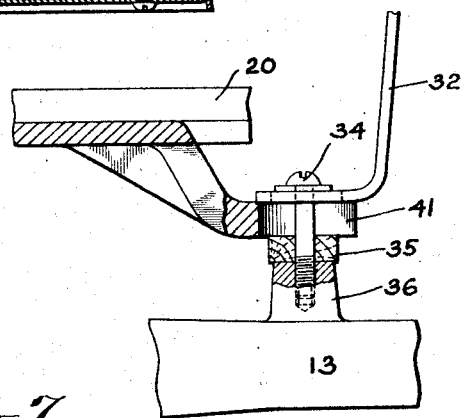
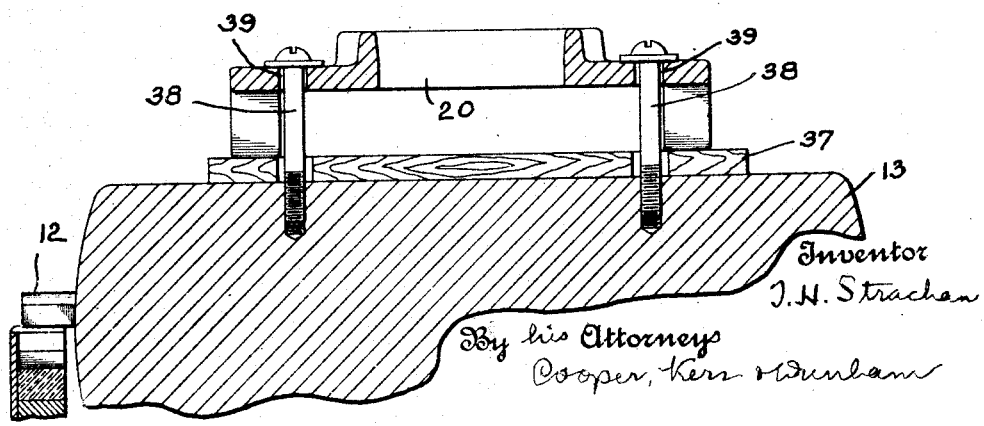
Inventor
T. H. Strachan
By his Attorneys
Cooper, Kerr & Dunham Patented Apr. 5, 1927.

1,623,137

UNITED STATES PATENT OFFICE.

THOMAS H. STRACHAN, OF DAYTON, OHIO, ASSIGNOR TO DAYTON SCALE COMPANY, OF DAYTON, OHIO, A CORPORATION OF NEW JERSEY.

SHIPPING ATTACHMENT FOR WEIGHING SCALES.

Application filed August 1, 1925. Serial No. 47,474.

This invention is directed to improvements in devices and attachments for use in connection with weighing scales and more particularly with the scales of the type shown in my copending application Serial No. 47472, filed August 1, 1925. More particularly the devices and attachments are intended for application to weighing scales to hold various parts thereof firmly in position and to prevent damage to these and other parts when shipping the scales.

The invention further has for its objects the provision of devices which may readily be applied at the factory and which also may be readily removed by a comparatively inexperienced person.

Further objects and advantages will be hereinafter set forth in the accompanying specification and claims and shown in the drawings which by way of illustration show preferred embodiments of my invention.

In the drawings:

Fig. 1 shows a perspective view of a scale with the devices and attachments applied thereto and the scale in condition for shipment.

Fig. 2 is a side elevational view of a scale with the improvements applied thereto. Certain parts are shown broken away and in section to show the interior construction.

Fig. 3 is a top plan view of the base lever system of a scale with my improved shipping spider applied thereto.

Fig. 4 is a detail view taken on line 4—4 of Fig. 3.

Fig. 5 is a side detail view taken on line 5—5 of Fig. 3.

Fig. 6 is a detail part sectional view taken on line 6—6 of Fig. 3.

Fig. 7 is a further detail sectional view taken on line 7—7 of Fig. 3.

Referring now to the drawings, 10 is the base casting of the scale having a fulcrum stand 11 which supports the fulcrum pivots 12 of lever 13 in the usual manner. 14 designates the load pivots of the scale which support the bearing frame 15 in the usual manner. 16 is the steelyard which, as shown in Fig. 2, is disconnected from the indicator and load counterbalancing operating connection generally designated 17. As shown in this figure, the steelyard 16 is tied by a cord 18 to the operating connection 17 and to one of the shipping bracket members 32 which will subsequently be described.

In preparing a scale for shipment provision should be made for lifting the main scale lever out of its cooperating bearings and further provision should be made for lifting the bearing frame out of cooperation with the load pivots. Also in weighing scales of this type the indicator and load counterbalancing operating connection member 17 has connected to its equalizer parts, racks and load counterbalancing springs. Provision should be made for preventing these parts shifting about during shipment of the scale. The means for securing these results will now be described.

Referring to Figs. 3 and 2, the base cover, not shown, the platform and like parts are first removed. A shipping spider generally designated 20 is then placed in position upon the top of the base cover. This shipping spider preferably is in the form of a casting having depending foot portions 21, 22 and 23. These foot portions are shouldered as shown at 24 (Figs. 3 and 4) to loosely fit inside the base housing. Before placing the spider in position the base housing 25 is covered with a suitable cushioning material such as a piece of felt 26. Thereafter screw studs 27 are tightened, drawing the spider tightly down into contact with the felt pads 26. Screws 27 preferably take into the pedestal-like bosses 28 which are integral with and a part of the base casting 10. Screws or studs 27 preferably extend through slots 30 in the spider 20 so that the screws may properly adjust themselves irrespective of slight irregularities of the base parts of the scale.

After the spider is in position a resilient metal strap member 32, Fig. 2, is secured to the operating connection 17 by means of a screw 33 which passes through an elongated slot in member 32. A suitable cushion or pad 33ª is placed between the member 32 and the column housing of the scale, and the slotted lower end of the member 32 is fitted under a stud 34, see Fig. 6. A suitable block of wood 35, preferably drilled or slotted to allow the stud 34 to pass therethrough, is placed between member 20 and the bosses 36 on the main scale lever 13. A similar wooden block 37 is placed under the forward end of the shipping spider and intermediate it and the forward end of the lever 20. Studs 38 pass through suitable slots 39 in the forward ends of the shipping spider, and these studs, as well as stud 34, which passes through a slot 41 in the spider 20, are then tightened up to draw the lever 13 vertically upward and to lift the fulcrum pivots 12 of the lever out of cooperation with the bearings. The various studs are tightened to firmly clamp the lever assembly to the shipping spider. With the parts in this position strap 32 acts to firmly but resiliently secure the movable operating connection 17 against displacement.

The bearing frame 15 may be lifted up and removed from cooperation with the load pivots 14 in a similar manner. Preferably this is brought about by tightening up on screws 40, Figs. 3 and 4. These screws 40 fit into threaded sockets in the bearing frame 15, as clearly shown in Fig. 4. Suitable wooden cushioning blocks 42 are also interposed between the bearing frame 15 and the spider 20. The scale is now in condition for shipment, and all movable parts are firmly secured against accidental displacement.

The slots 39, 30 and 41 permit the various lever and bearing frame parts to be raised freely and without binding or stressing the same. The studs adjust their positions as required by the position and configuration of the parts. The wooden blocks 37, 35 and 42 serve as cushion members which prevent shocks which occur during shipping of the scale from shearing off the various studs. A slight shift of the parts can take place without, however, excessive movement thereof. Furthermore the bearing frame itself can slightly shift and adjust itself to base covers of slightly different size or configuration.

I claim:

1. A shipping attachment for a weighing scale having a base lever system and a displaceable operating connection to the weight indicator and load counterbalancing means comprising a spider device adapted for cooperation with fixed parts of the scale with provisions for holding the base lever system against movement when shipping the scale, and means associated with said spider and arranged for connection to the aforesaid operating connection for securing the operating connection and its associated parts against movement when the scale is shipped.

2. In a weighing scale having a displaceable operating connection associated with the weight indicator and load counterbalancing device, and removable resilient means adapted for connection with said operating connection and with relatively fixed means for preventing displacement of said operating connection and its associated parts when the scale is shipped, the resiliency of said means preventing damage to movable parts upon the scale receiving shocks in shipment.

3. A weighing scale having a bearing frame and a main scale lever, a base housing, a shipping spider supported thereon, means for drawing up the bearing frame and main lever to a position in which they are supported by the shipping spider and cushioning blocks interposed between the shipping spider and the lever and bearing frame for the purpose described.

4. In a weighing scale provided with the usual bearing frame and lever and having a shipping spider supported upon a base housing, said shipping spider having elongated slots through which studs are adapted to pass and studs passing through said slots for drawing up the bearing frame and lever, said slots permitting relative adjustment of said studs with respect to the shipping spider.

5. In a weighing scale having a weight lever and cooperating bearings, a shipping spider for supporting said lever out of its bearings during shipment and cushioning blocks interposed between said lever and said shipping spider for cushioning shocks received in shipment.

In testimony whereof I hereto affix my signature.

THOMAS H. STRACHAN.